(12) United States Patent
Kim

(10) Patent No.: US 7,679,221 B2
(45) Date of Patent: Mar. 16, 2010

(54) POWER SAVING SWITCH

(75) Inventor: Hyo Gu Kim, Deajeon (KR)

(73) Assignee: Botem Electronic Co., Ltd. (KR)

( * ) Notice: Subject to any disclaimer, the term of this patent is extended or adjusted under 35 U.S.C. 154(b) by 369 days.

(21) Appl. No.: 10/588,245

(22) PCT Filed: Feb. 1, 2005

(86) PCT No.: PCT/KR2005/000293

§ 371 (c)(1),
(2), (4) Date: Jun. 8, 2007

(87) PCT Pub. No.: WO2005/073993

PCT Pub. Date: Aug. 11, 2005

(65) Prior Publication Data

US 2007/0290630 A1 Dec. 20, 2007

(30) Foreign Application Priority Data

| Feb. 2, 2004 | (KR) | 20-2004-0002467 |
| Jun. 1, 2004 | (KR) | 10-2004-0039441 |
| Jun. 29, 2004 | (KR) | 10-2004-0049555 |
| Sep. 22, 2004 | (KR) | 10-2004-0075757 |

(51) Int. Cl.
*H01H 35/00* (2006.01)
(52) U.S. Cl. .................. 307/116; 307/112
(58) Field of Classification Search .............. None
See application file for complete search history.

(56) References Cited

U.S. PATENT DOCUMENTS

| 4,175,231 A | | 11/1979 | Murata et al. ............ 250/227 |
| 4,407,447 A | * | 10/1983 | Sayegh ................... 236/49.3 |
| 4,514,729 A | * | 4/1985 | Szarka ...................... 340/3.4 |
| 4,874,063 A | * | 10/1989 | Taylor ....................... 187/391 |
| 4,969,508 A | * | 11/1990 | Tate et al. .................. 165/209 |
| 5,055,669 A | * | 10/1991 | Blake et al. ........... 250/214 AL |
| 5,187,688 A | * | 2/1993 | Saruta ........................ 367/96 |
| 5,386,210 A | * | 1/1995 | Lee ............................ 340/567 |

(Continued)

FOREIGN PATENT DOCUMENTS

JP 5818537 2/1983

(Continued)

OTHER PUBLICATIONS

International Search Report; PCT/KR2005/000293; Date: May 30, 2005 All the references cited in the Search Report are listed above.

(Continued)

*Primary Examiner*—Stephen W Jackson
*Assistant Examiner*—Adi Amrany
(74) *Attorney, Agent, or Firm*—Cantor Colburn LLP

(57) ABSTRACT

A power saving switch which can turn on an electric device manually by manipulation of an automatic switch button or a manual switch button by a user, and simultaneously, stop operation of a sensor for a predetermined time period in order for the sensor to fail detection of an entering of the user into an object area, and which can turn off the electric device automatically or output predetermined sound so as to make the user turn off the electric device manually when the user goes out of the object area.

4 Claims, 11 Drawing Sheets

U.S. PATENT DOCUMENTS

| | | | | |
|---|---|---|---|---|
| 5,406,173 | A * | 4/1995 | Mix et al. | 315/156 |
| 5,455,487 | A * | 10/1995 | Mix et al. | 315/150 |
| 5,473,202 | A * | 12/1995 | Mudge et al. | 307/116 |
| 5,510,975 | A * | 4/1996 | Ziegler, Jr. | 700/49 |
| 5,519,784 | A * | 5/1996 | Vermeulen et al. | 382/100 |
| 5,546,071 | A * | 8/1996 | Zdunich | 340/541 |
| 5,598,042 | A * | 1/1997 | Mix et al. | 307/116 |
| 5,627,586 | A | 5/1997 | Yamasaki | 348/169 |
| 5,640,143 | A * | 6/1997 | Myron et al. | 340/541 |
| 5,962,989 | A * | 10/1999 | Baker | 315/294 |
| 6,404,079 | B1 * | 6/2002 | Hsieh | 307/117 |
| 6,466,826 | B1 * | 10/2002 | Nishihira et al. | 700/17 |
| 6,522,078 | B1 | 2/2003 | Okamoto et al. | |
| 6,712,269 | B1 * | 3/2004 | Watkins | 235/385 |
| 6,759,954 | B1 * | 7/2004 | Myron et al. | 340/522 |
| 6,792,319 | B1 * | 9/2004 | Bilger | 700/13 |
| 6,912,429 | B1 * | 6/2005 | Bilger | 700/19 |
| 7,030,756 | B2 * | 4/2006 | Issal | 340/539.27 |
| 7,155,317 | B1 * | 12/2006 | Tran | 700/259 |
| 7,292,142 | B2 * | 11/2007 | Simon et al. | 340/539.17 |
| 7,309,965 | B2 * | 12/2007 | Dowling et al. | 315/318 |
| 7,403,598 | B2 * | 7/2008 | Tyroler et al. | 379/37 |
| 7,411,489 | B1 * | 8/2008 | Elwell et al. | 340/501 |
| 7,448,548 | B1 * | 11/2008 | Compton | 235/440 |
| 2005/0125083 | A1 * | 6/2005 | Kiko | 700/19 |
| 2005/0226463 | A1 * | 10/2005 | Suzuki et al. | 382/103 |
| 2005/0236906 | A1 * | 10/2005 | Morgan et al. | 307/117 |
| 2006/0090079 | A1 * | 4/2006 | Oh et al. | 713/186 |
| 2006/0125624 | A1 * | 6/2006 | Ostrovsky et al. | 340/527 |

FOREIGN PATENT DOCUMENTS

| | | |
|---|---|---|
| JP | 1318989 | 12/1989 |
| JP | 2001273810 | 10/2001 |
| KR | 200327478 | 9/2003 |
| KR | 200341357 | 1/2004 |

OTHER PUBLICATIONS

PCT International earch Report; PCT/KR2005/000293; Dated: May 30, 2005.

* cited by examiner

[Fig. 1]
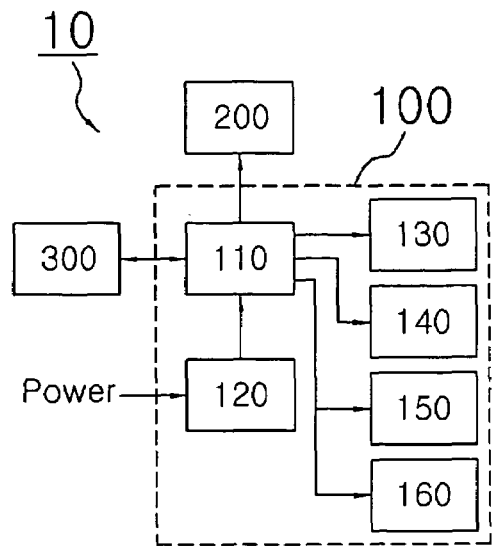
[Fig. 2]
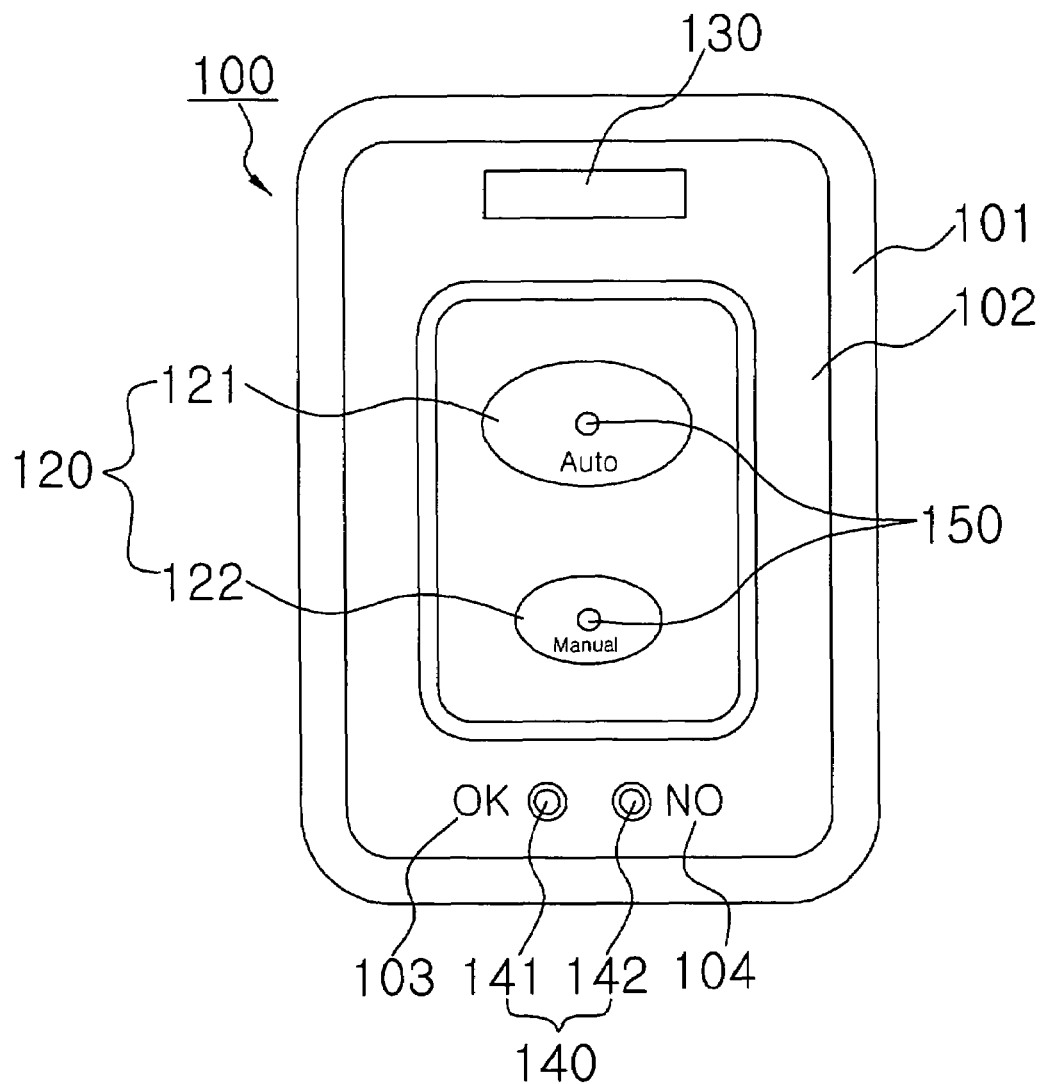

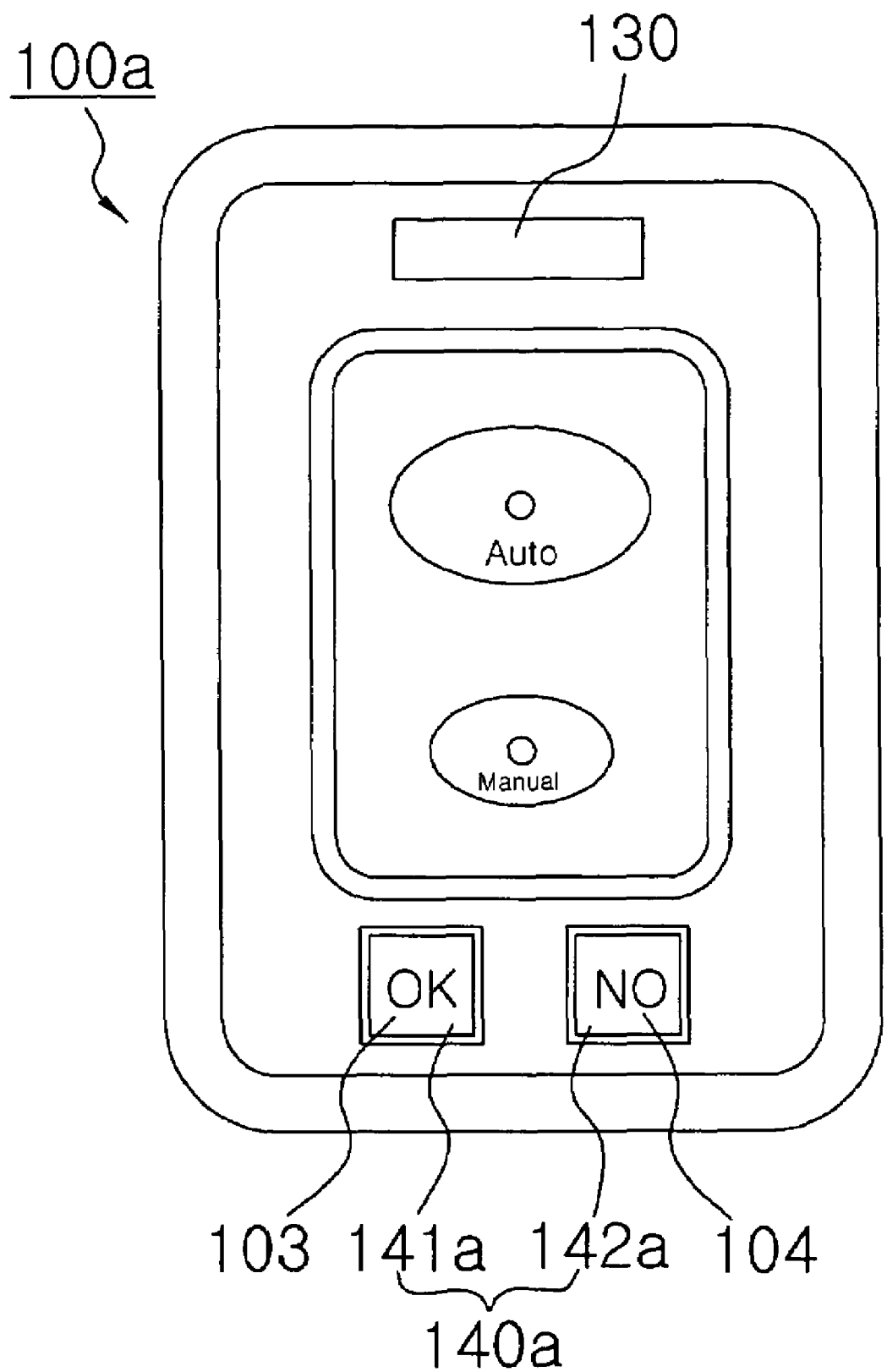
[Fig. 3]

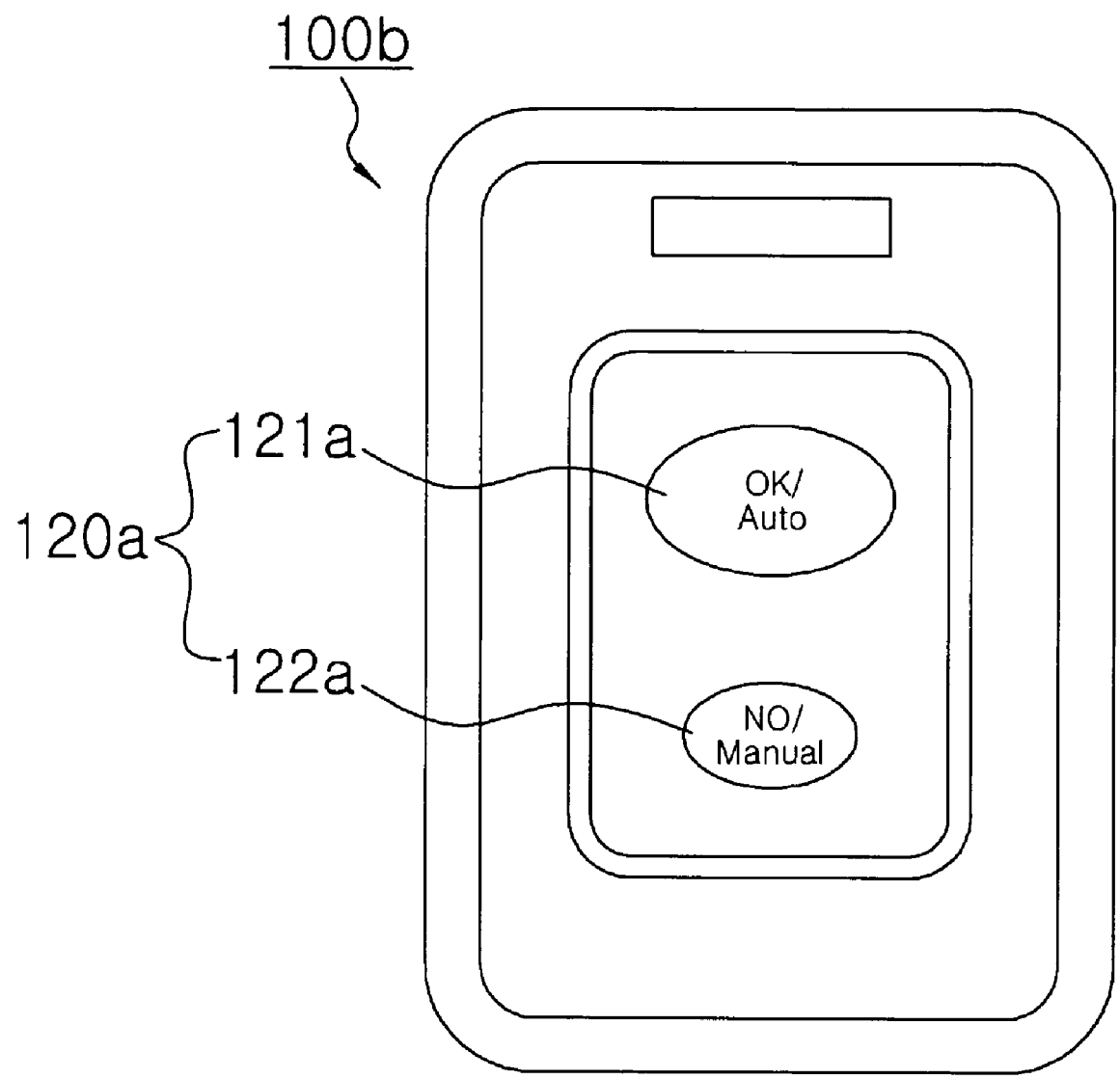
[Fig. 4]

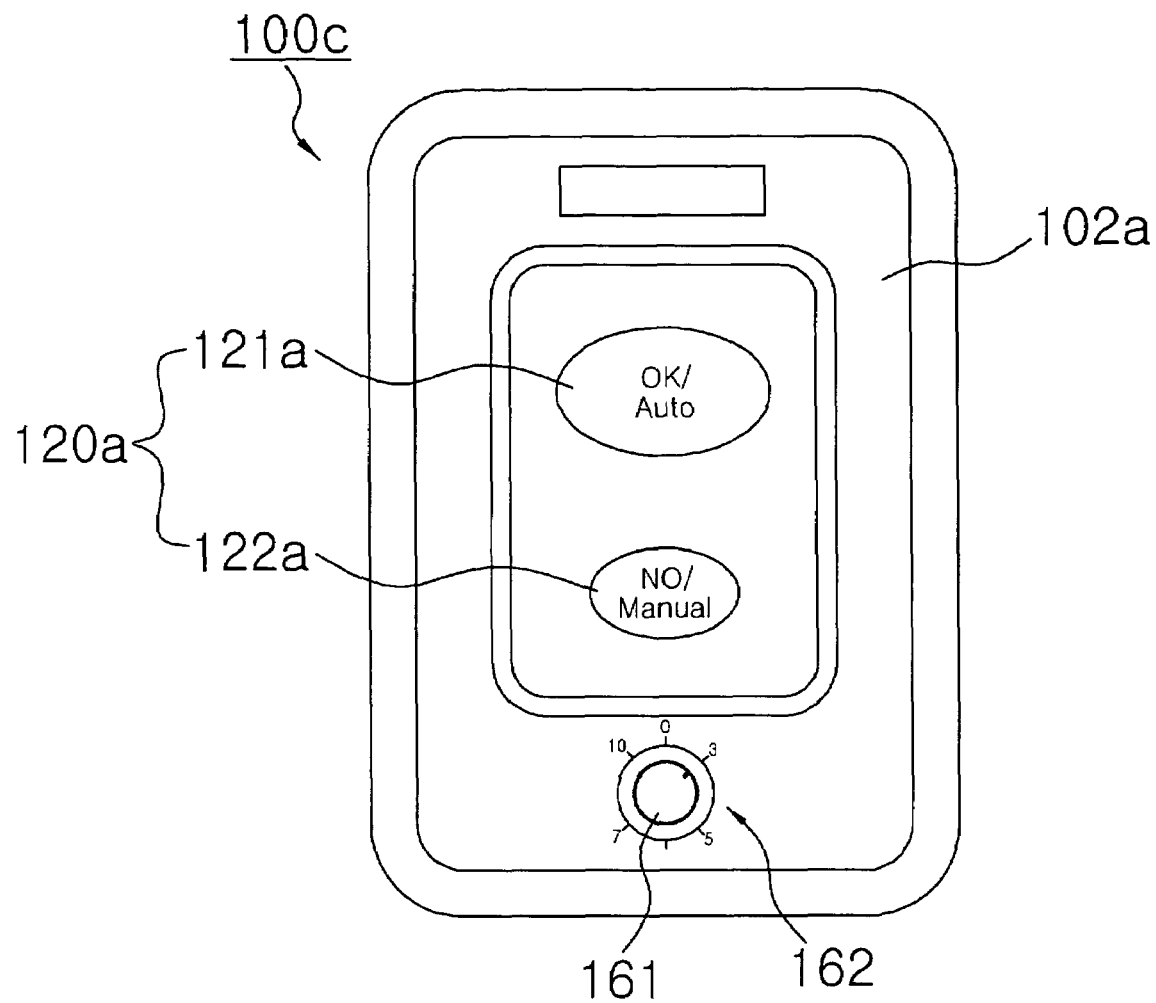
[Fig. 5]

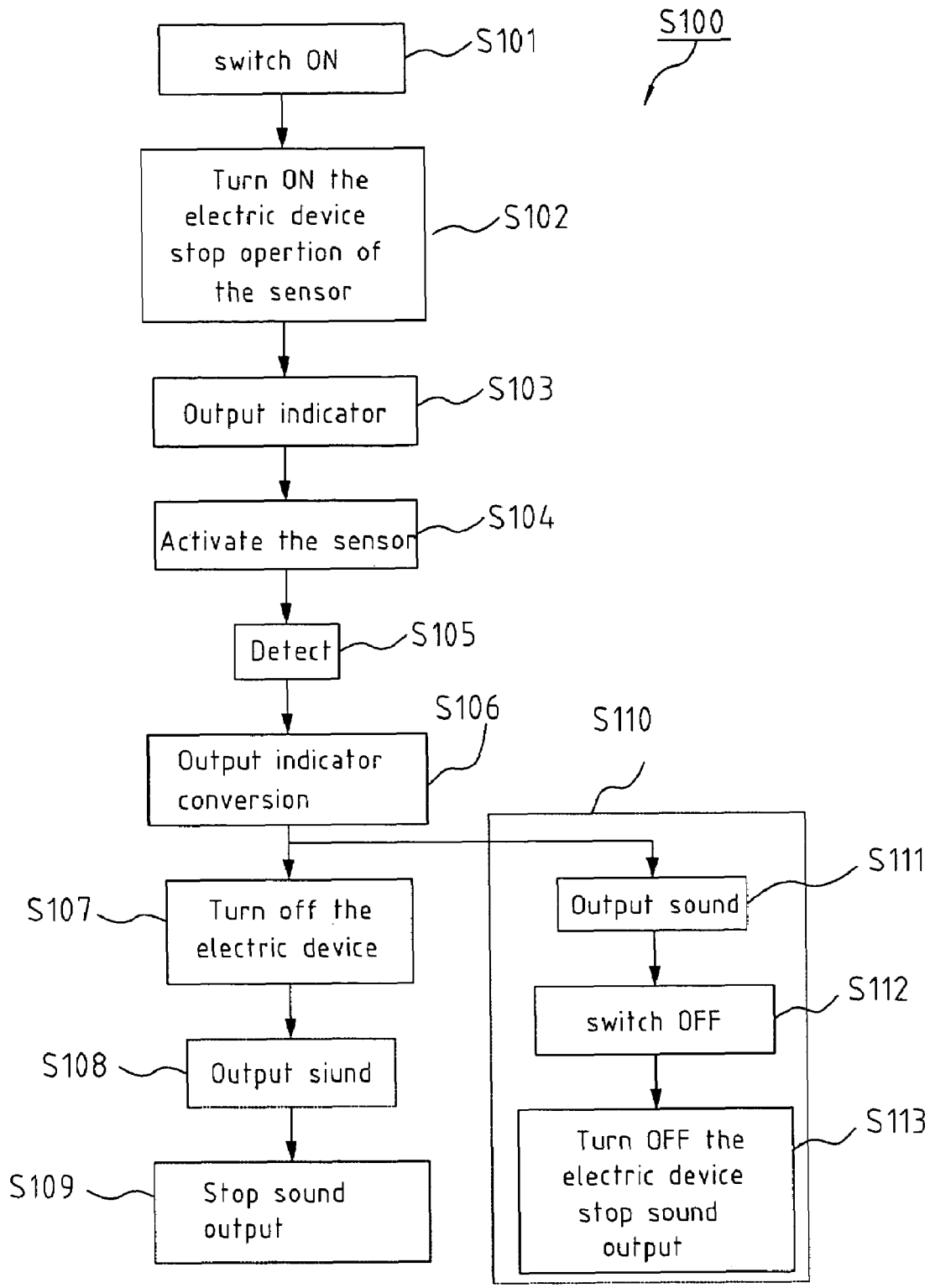
[Fig. 6]

[Fig. 7]
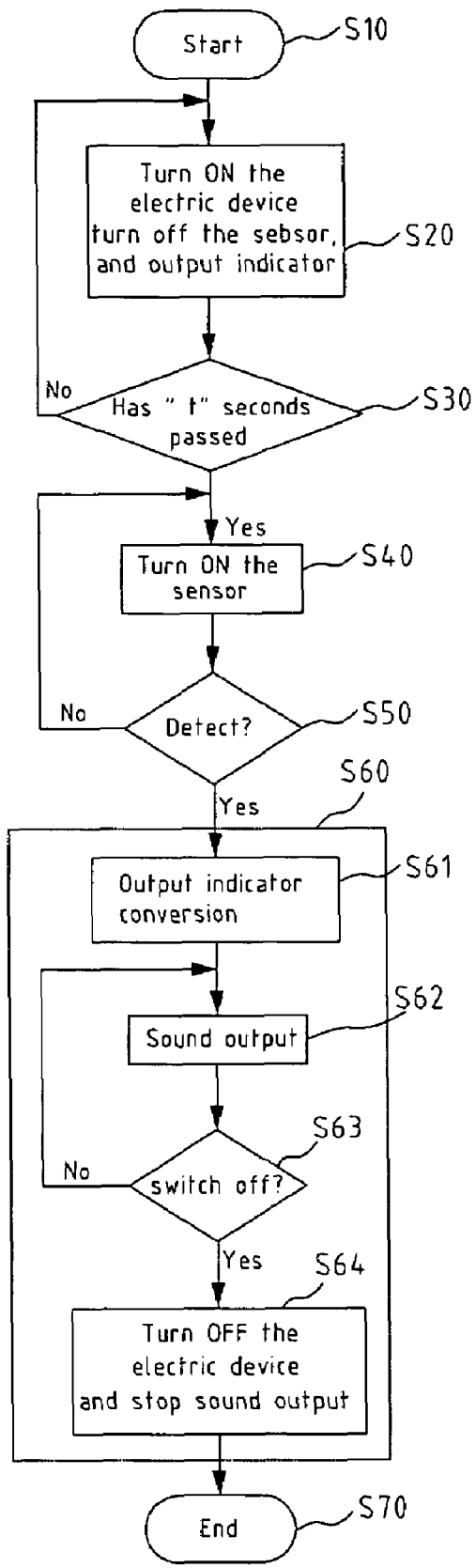

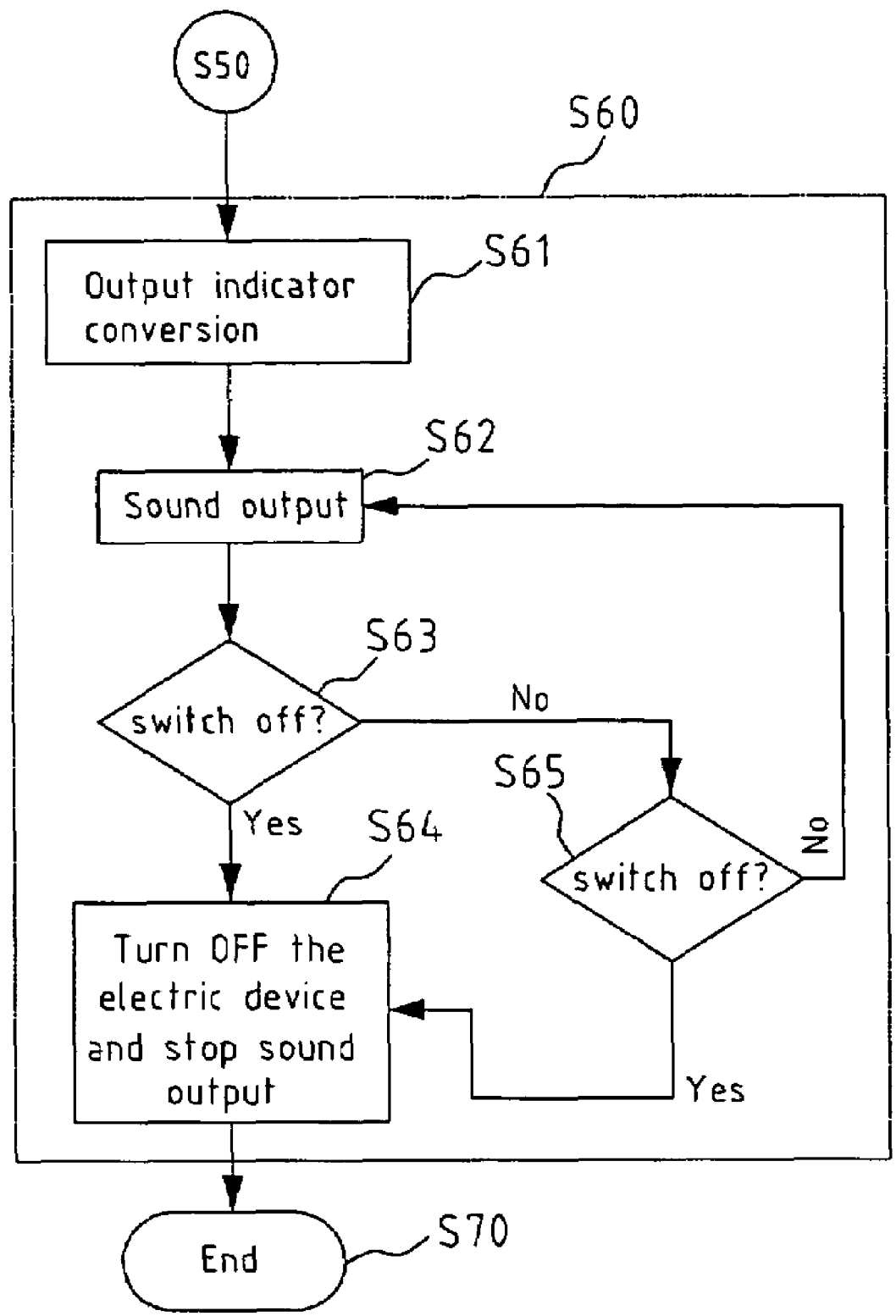
[Fig. 8]

[Fig. 9]
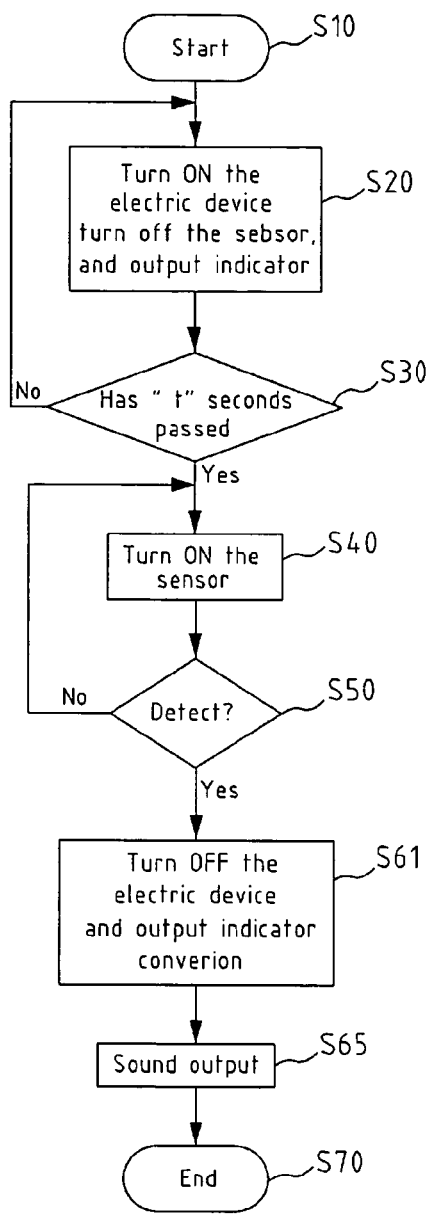
[Fig. 10]
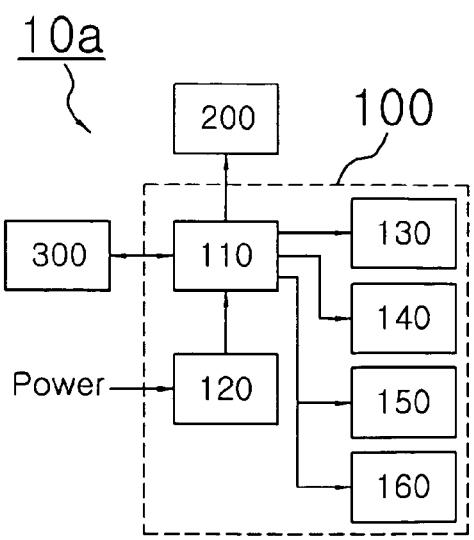

[Fig. 11]
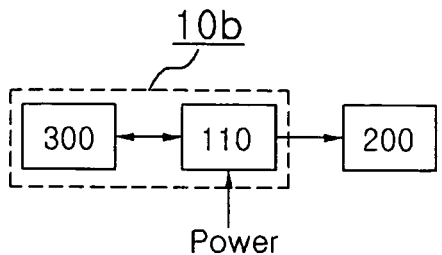
[Fig. 12]
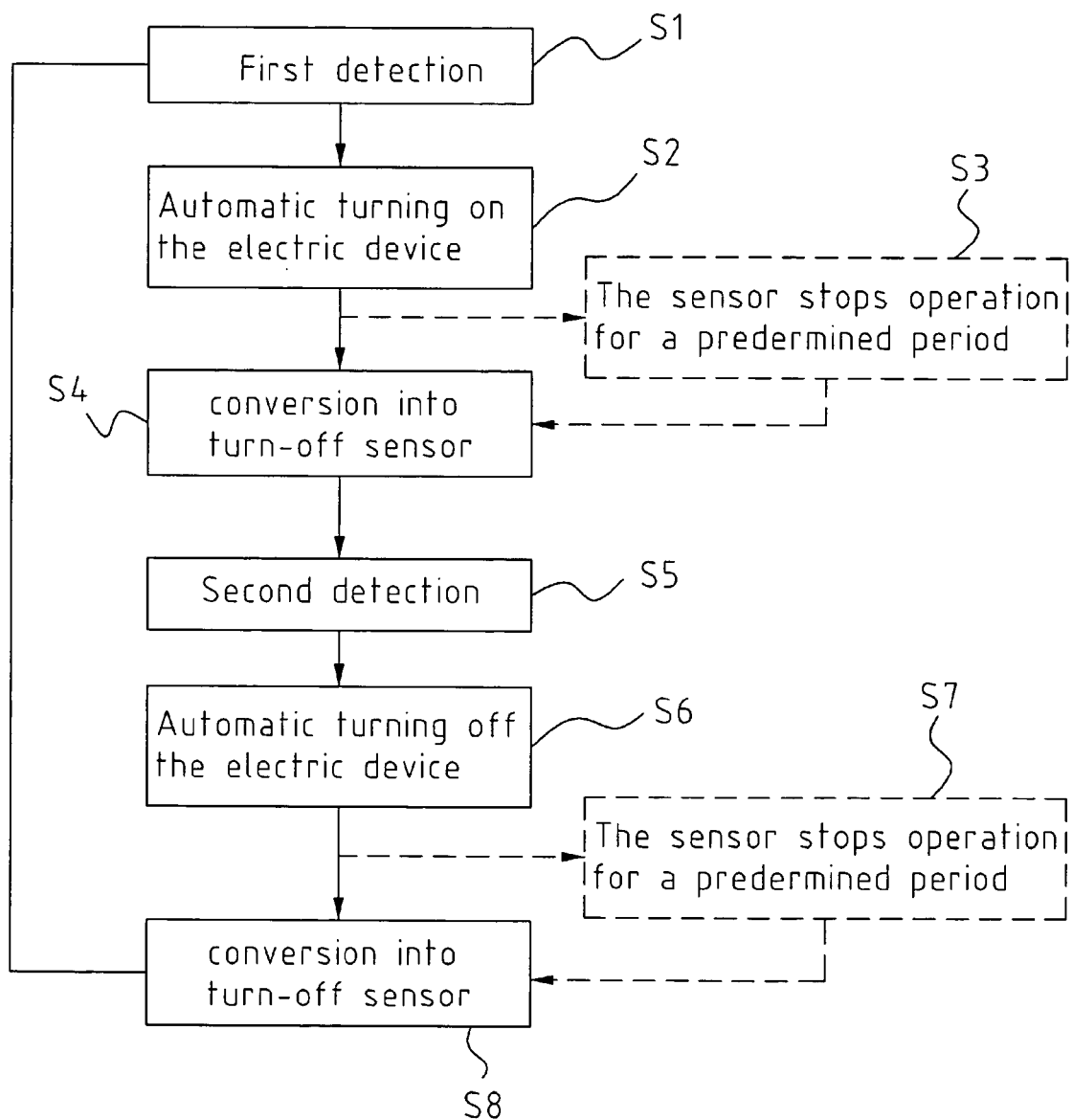

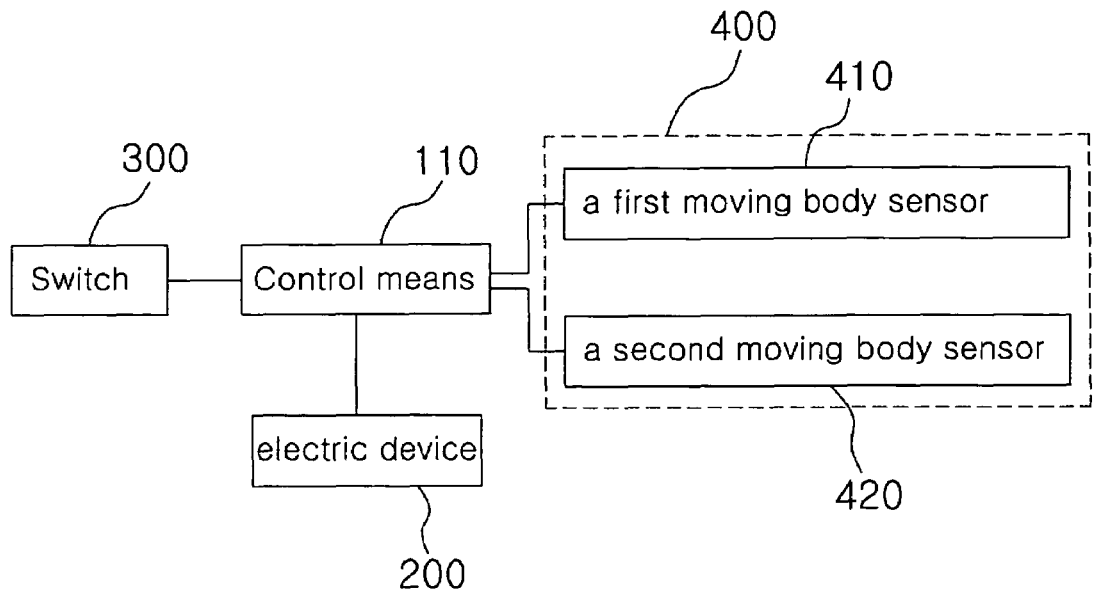
[Fig. 13]
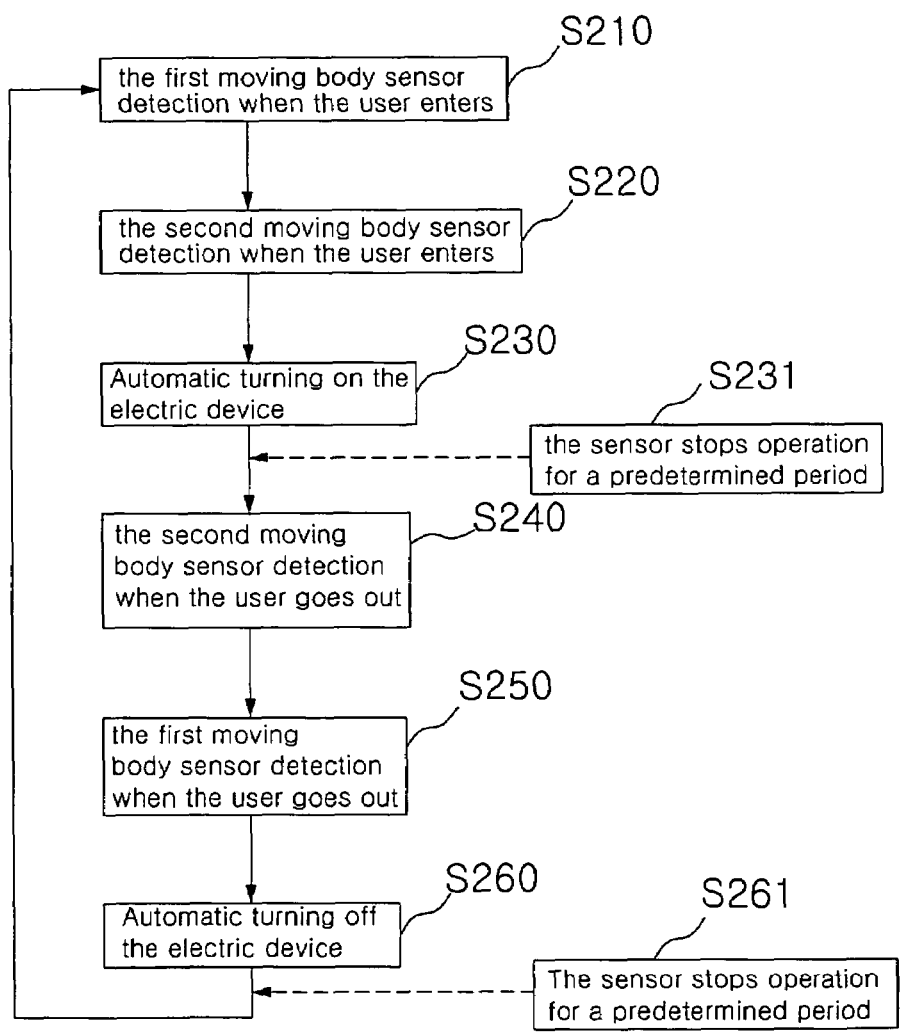
[Fig. 14]

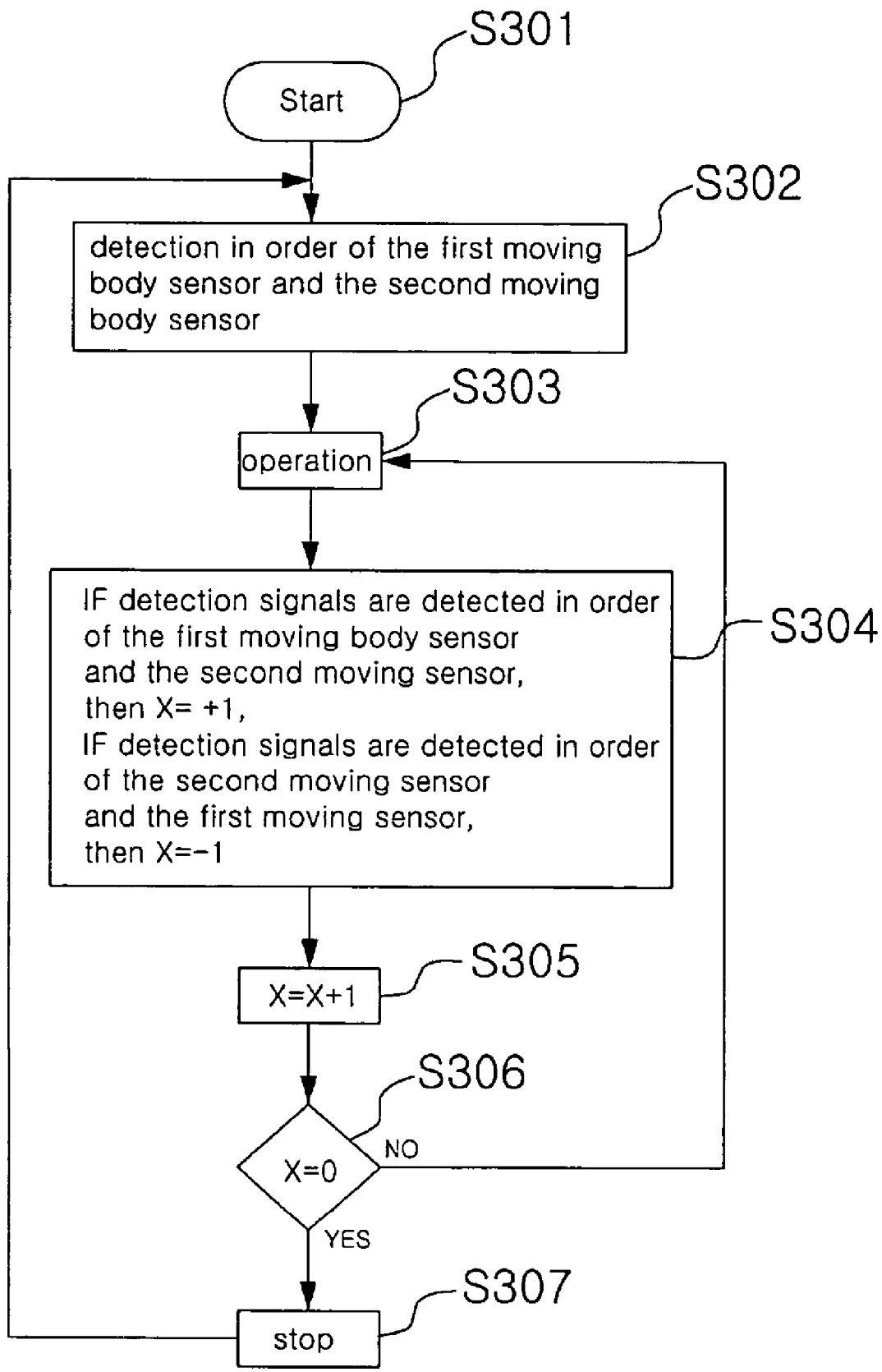
[Fig. 15]

POWER SAVING SWITCH

TECHNICAL FIELD

The present invention relates to a power saving switch, and more particularly, to a power saving switch, which can prevent a sensor from detecting approaching of a user by stopping operation of the sensor when the user turns on an electric device manually while entering an object area, such as a toilet, and which can automatically turn off the electric device by operation of the sensor when the user gets out of the object area or make the user stop operation of the electric device manually by outputting pre-determined sound.

BACKGROUND ART

In recent years, in Korea, The amount of energy used for illumination reaches 18% of the total electric energy consumption amount, and is being greatly increased every year according to the highly-graded life environment. Nowadays, according to the worldwide tendency of conservation of earth environment, attempts for minimizing environmental pollution by efficiently using electric power through improvement of energy efficiency in the illumination field and through energy saving have been made very positively.

In general, for example, the most universally used electric devices are incandescent lamps, fluorescent lamps, and so on.

Since a typical illumination system using such electric device is provided with a power switch, which is turned on or off only by manual manipulation of a user, when the switch is in an on-status during absence of users, electric power is wasted due to continuous lighting of the electric device. Furthermore, the conventional illumination system has another problem in that the user has to manipulate the switch every time in order to turn on or off the electric device.

Such problems could be considerably solved by a human sensing illumination system disclosed recently.

The human sensing illumination system, which is installed in a frequently used area by people, such as the entrance, the front door, the hallway, stairs, the approach of an elevator, a warehouse, or others, automatically turns on an electric device when illuminance is lower than a predetermined value and when a user enters the area, and turns off the electric device when illuminance is higher than the predetermined value and when there is no user in the area. The human sensing illumination system provides illumination effect without operation of the switch by the user every time so as to improve convenience in use, and prevents waste of electric power so as to enable electric power to be efficiently used.

The human sensing illumination system will be described in more detail. The illumination system detects infrared rays (6.5□~15□) generated from the human body, detects movement of the human body within a detection range at a long distance using a noncontact type pyroelectric sensor, transmits the infrared rays emitted from the human body to a pyroelectric type infrared sensor through a Fresnel lens, and transmits output voltage of the sensor to the first amplifier circuit. The first amplifier circuit serves as a band pass filter and an amplifier, and has the amplifying level of about 40 dB. The first amplified small signal is transmitted to the second amplifier circuit through a coupling condenser, and a signal outputted from the second amplifier circuit is transmitted to a window comparator. Square wave is outputted when signal of a pre-determined voltage and more is outputted, so that the electric device is turned on or off through a timer circuit and a triac on/off circuit.

Here, the triac on/off circuit includes an illumination sensor having a CDS element, which is made of compound where cadmium (Cd) and sulfur (S) are mixed with each other, whose resistance is rapidly reduced when light of a predetermined amount is detected, and whose resistance is increased to several hundreds of ohm ($\Omega$). Therefore, the triac on/off circuit can provide the illumination environment corresponding to illuminance by selectively opening and closing the circuit according to a change of illuminance.

As described above, the human sensing illumination system having the above operation principle cannot show its function if any one of the above components is omitted, and it is impossible to use it in a sealed area, such as the toilet. That is, when the user enters the toilet, the human sensing illumination system detects the user and turns on the electric device. After that, when movement of the user is not detected, the human sensing illumination system turns off the electric device automatically after a predetermined time period, and thereby, it increases a feeling of uneasiness in easing nature.

Furthermore, the human sensing illumination system provides convenience to the user as providing the automatic turning-on and the automatic turning-off, but has a disadvantage in that the user cannot easily turn on or off the electric device manually according to the user's intention when the user wants to turn on the electric device for work under a state where the illuminance sensor detects above the predetermined value of illuminance. Moreover, the human sensing illumination system has several disadvantages in that the lifetime of the electric device is reduced due to frequent turning-on and turning-off when there is excessive change of illuminance due to a rapid weather change, in that the illuminance sensor is frequently in error, and in that the whole human sensing illumination system must be replaced when the illuminance sensor loses its function.

In addition, as described above, since the CDS element applied to the illuminance sensor is made of compound of cadmium (Cd) and sulfur (S), which is harmful to human body and is not environmentally friendly, the human sensing illumination system has another problem in that the compound must be gathered and treated separately.

As the CDS element applied to the illuminance sensor, there are a photoelectric tube, a phototransistor, a photodiode, and so on, which provide an effect similar to the CDS element. However, they cannot be applied to the human sensing illumination system as being too large and bulky, increase the manufacturing cost as being too expensive, and cannot realize a compact type human sensing illumination system. Furthermore, since they provide not the principle for opening or closing the corresponding circuit according to increase and decrease of a resistance value like the CDS element but the principle for generating electric current according to irradiation dose of light, the user must use the illumination system with care due to discharge of electricity, and so, they cannot be applied to the human sensing illumination system.

Therefore, required is an illumination apparatus, which can omit the illuminance sensor, which can turn on or off the electric device automatically and/or manually in order to improve convenience in use, which can prevent waste of electric power even though the electric device is turned on or off manually, to which various sensors besides the infrared sensor can be applied for detecting a moving body, and which provides a simple structure and an improved circuit design, thereby considerably reducing an error ratio and the manufacturing cost.

DISCLOSURE OF INVENTION

Technical Problem

Accordingly, the present invention has been made in view of the above problems, and it is an object of the present invention to provide a power saving switch, which is installed on the inner wall surface and/or the outer wall surface of the entrance in such a way that a user turns on an electric device manually, and at the same time, a sensor turns off the electric device for a predetermined time period in order to fail detection of approaching of the user, and when the user goes out of an object area, the sensor automatically turns on the electric device by detecting the going-out of the user or outputs predetermined sound in order to inform the user of the turning-off of the electric device.

Another object of the present invention is to provide a power saving switch, which can omit the illuminance sensor and, which is installed on the outer wall surface of the entrance in order to inform that a user exists inside an object area, by lighting up or displaying predetermined characters or figures or by turning on an electric device of a predetermined color.

A further object of the present invention is to provide a power saving switch, which can turn off the electric device automatically or manually according to the moving body detection or the opening and closing of a door by adopting a moving body sensor, such as an infrared sensor, an ultrasonic sensor, an optical sensor and a proximity sensor, for detecting approaching of the user, or a pair of door-opening sensors, such as magnetic sensors or proximity sensors, mounted on the door and a doorframe for detecting the opening and closing of the door, and which can be applied to the opened entrance, the closed entrance having a door, the opened hallway, stairs, and so on.

A still further object of the present invention is to provide a power saving switch, which can remove inconvenience due to repeated turning-on and turning-off of the electric device when a number of users share and use a specific object space, thereby automatically turning on the electric device and continuously keeping the operation of the electric device even though the plural users enter the specific object space at different time intervals.

Another object of the present invention is to provide a power saving switch, which includes moving body sensors arranged on an entrance side and the inside of the specific object space and inside the specific object space, thereby automatically turning on the electric device when a user enters the specific object space, and automatically turning off the electric device after detection of going in/existence/going out of the user.

Technical Solution

According to a first aspect of the present invention, the present invention provides a power saving switch including: a sensor selected from a moving body sensor or a door-opening sensor; an input part for receiving a manual turning-on or turning-off signal of an electric device; and control means electrically connected with the sensor, the input part and the sensor, wherein the control means operates the electric device and stops operation of the sensor for a predetermined time period when the manual turning-on signal is inputted into the input part, and wherein the control means activates the sensor after a lapse of the predetermined time period and automatically turns on the electric device when the detection signal is received.

Here, the power saving switch further includes at least one indicator electrically connected with the control means and selected from a light emitting element, a character information output part, or a figure information output part to output information corresponding to the turning-on and turning-off of the electric device.

The power saving switch further includes a sound output part electrically connected with the control means for outputting a predetermined sound when the sensor detects the detection signal or when the electric device is automatically turned on.

The power saving switch further includes a time setting part electrically connected with the control means for selectively setting operation stopping time of the sensor.

After the manual operation of the electric device, the input part includes a manual switch button for stopping operation of the sound output part and for stopping operation of the electric device manually by button-pressing of a user, after the sound output part outputs the predetermined sound by control of the control means when the sensor detects a moving body or opening or closing of the door after the manual turning-on of the electric device.

The light emitting element is located on the input part.

The sensor is a moving body sensor selected from an infrared sensor, an ultrasonic sensor, an optical sensor and a proximity sensor.

A pair of the sensors are respectively mounted on a door and a doorframe, and are door-opening sensors selected from a magnetic sensor and a proximity sensor for detecting the opening and closing of the door.

The magnetic sensor includes: a permanent magnet mounted on the door; a metal plate mounted on the doorframe corresponding to the permanent magnet; the control means electrically connected with the metal plate; and a solenoid electromagnet electrically connected with the control means, the solenoid electromagnet turning on the electric device manually according to input of the input part, and at the same time, magnetizing the metal plate for a predetermined time period.

the magnetic sensor includes:

a permanent magnet mounted on the door;

a metal plate mounted on the doorframe to correspond to the permanent magnet;

control means electrically connected with the metal plate; and a solenoid electromagnet electrically connected with the control means, the solenoid electromagnet turning on the electric device manually according to the signal input of the input part, and at the same time, magnetizing the metal plate for a pre-determined time period.

The magnetic sensor includes: a permanent magnet mounted on the door; a pair of metal plates mounted on the doorframe to correspond to the permanent magnet, the metal plates being separated from each other; control means electrically connected respectively with two metal plates; and a solenoid electromagnet electrically connected with the control means, the solenoid electromagnet turning on the electric device manually according to the signal input of the input part, and at the same time, magnetizing one of the metal plates for a predetermined time period in order for the metal plates to form magnetic contact points with each other.

In another aspect of the present invention, the present invention provides a method for controlling a power saving switch including the steps of: a) manually turning on an electric device by a user's use of an input part; b) after the manual turning step, supplying electric power to the electric device, and at the same time, stopping operation of a sensor for a predetermined time period; c) activating the sensor after a lapse of the predetermined time period; and d) blocking supply of electric power to the electric device in order to automatically stop operation of the electric device by receiving a detection signal of a moving body or the opening and closing of a door from the sensor.

The b) step further includes a step of outputting a use-status information by an indicator, and the d) step further includes a step of conversion-outputting of the use-status information by the indicator.

The d) step further includes a step of outputting a predetermined sound through a sound output part for a predetermined time period.

The d) step includes a step of outputting sound by the sound output part without automatically blocking supply of electric power to the electric device in order for the user to press the input part, and thereby, stopping operation of the electric device manually and stopping the sound output of the sound output part.

In a further aspect of the present invention, the present invention provides a power saving switch, which controls an automatic turning-on and tuning-off of an electric device without additional switching action, including: a sensor selected from a moving body sensor or a door-opening sensor; and control means electrically connected with the sensor and an electric device, the control means automatically turning on the electric device when receiving a detection signal of a moving body or an opening of a door from the sensor, the control means converting the sensor into a turn-off sensor after a predetermined time period from the automatic operation of the electric device, the control means automatically turning off the electric device when receiving the detection signal of the moving body and the opening of the door again.

The control means further includes at least one selected from an indicator for outputting light-emitting information, character information or figure information, which corresponds to the turning-on and turning-off of the electric device, to the outside of an entrance; a sound output part for outputting predetermined sound during the automatic turning-on or turning-off of the electric device; and a time setting part for selectively setting a predetermined time period until the sensor is converted into the turn-off sensor after the electric device is automatically turned on by the sensor.

It is preferable that the moving body sensor is at least one selected from an infrared sensor, an ultrasonic sensor, an optical sensor and a proximity sensor, and a pair of door-opening sensors are respectively mounted on the door and a doorframe, and is at least one selected from a magnetic sensor and a proximity sensor for detecting the opening and closing of the door.

In another aspect of the present invention, the present invention provides a power saving switch including: a first moving body sensor arranged on an entrance of a specific object space or on a position adjacent to the entrance; a second moving body sensor arranged in the inward direction of the specific object space from the first moving body sensor; and control means electrically connected with the first and second moving body sensors, wherein the control means automatically turns on an electric device installed inside the specific object space when a detection signal of the second moving body sensor is received after a detection signal of the first moving body sensor is received, and wherein the control means automatically turns off the electric device when the detection signal of the first moving body sensor is received after the detection signal of the second moving body sensor is received.

The control means performs operation in such a manner as to increment by 1 whenever the detection signal of the second moving body sensor is received after the detection signal of the first moving body sensor is received, performs operation in such a manner as to decrement by 1 whenever the detection signal of the first moving body sensor is received after the detection signal of the second moving body sensor is received, and automatically turns off the electric device installed inside the specific object space whenever the operation result is 0. The control means of the power saving switch automatically stops operation of the electric device by counting the detection number of the sensors when there is no user inside the specific object space, namely when the operation result is 0, so that the electric device can be turned off when there is no user inside the specific object space even though lots of users enter and leave the specific object space such as a public toilet in random order.

After the automatic turning-on and turning-off, if operation of the sensors is not stopped for a predetermined time period, the sensors are continuously operated and the electric device may repeat unnecessary turning-on and turning-off actions due to the user's movement adjacent to the moving body sensors. To solve the above problem, it is preferable that the control means stops operation of the first and second moving body sensors for a predetermined time period after automatically turning on the electric device installed inside the specific object space when the detection signal of the second moving body sensor is received after the detection signal of the first moving body sensor is received, and wherein the control means stops operation of the first and second moving body sensors for a predetermined time period after automatically turning off the electric device installed inside the specific object space when the detection signal of the first moving body sensor is received after the detection signal of the second moving body sensor is received.

Furthermore, the power saving switch further includes a manual switch arranged on the entrance of the specific object space for manually turning on and off the electric device according to a user's manipulation, and an indicator electrically connected with the control means for outputting information corresponding to the turning-on and turning-off of the electric device.

Moreover, it is preferable that the first moving body sensor is mounted on a doorframe of the specific object space, and the second moving body sensor is mounted on a position adjacent to the electric device. It is preferable that the control means is mounted on one of the first moving body sensor, the second moving body sensor, or a switch box having the manual switch.

In a further aspect of the present invention, the present invention provides a power saving switch including: a first moving body sensor arranged on an entrance of a specific object space or on a position adjacent to the entrance; a second moving body sensor arranged in the inward direction of the specific object space from the first moving body sensor; and control means electrically connected with the first and second moving body sensors, wherein the control means automatically turns on an electric device installed inside the specific object space when a detection signal of the first moving body sensor is received, and wherein the control means automatically turns off the electric device when the detection signal of the first moving body sensor is received after the detection signal of the second moving body sensor is received. The control means stops operation of the first and second moving body sensors for a pre-determined time period when the detection signal of the second moving body sensor is received after the detection signal of the first moving body sensor is received or when the detection signal of the first moving body sensor is received after the detection signal of the second moving body sensor is received.

In a still further aspect of the present invention, the present invention provides a method for controlling a power saving switch comprising the steps of: i) automatically turning on an electric device installed inside a specific object space when a detection signal of a second moving body sensor arranged in the inward direction of the specific object space from a first moving body sensor is received after a detection signal of the first moving body sensor arranged on an entrance of the specific object space or on a position adjacent to the entrance is received; and ii) automatically turning off the electric device installed inside the specific object space when the detection signal of the first moving body sensor is received after the detection signal of the second moving body sensor is received. It is preferable that the i) step further includes a step of performing operation in such a manner as to increment by 1 whenever the detection signals are received in the detection order of the moving body sensors of the i) step, and wherein the ii) step further includes steps of performing operation in such a manner as to decrement −1 whenever the detection signals are received in the detection order of the moving body sensors of the ii) step and automatically turning off the electric device installed inside the specific object space whenever the operation result is 0. In addition, it is preferable that the method for controlling a power saving switch further includes a step of stopping operation of the first and second moving body sensors for a predetermined time period after the i) step of automatically turning on the electric device and after the ii) step of automatically turning off the electric device.

Here, the power saving switch according to the present invention is installed on the outer wall surface and/or the inner wall surface of the opened entrance without having an opening/closing door, the opened hallway, the closed entrance having an opening/closing door, and/or a closed place, such as a toilet, an inner room and a studying room. The sensor can be mounted integrally with a switch box, which will be described later, or mounted on the upper portion or the side lower end of a doorframe, or the entrance, and is electrically connected with the control means mounted inside the switch box. The specific object space means an area which has an independent inner space such as a toilet, an inner room or a veranda and an electric device equipped therein, and is connected with another space through an entrance, particularly including a public facility such as a public toilet for use of a number of users.

The sensor can be located at any position, but it is the most preferable that the first moving body sensor is mounted at 20 cm~50 cm distance from the left edge or right edge of the upper portion of the doorframe, or at 60 cm~90 cm distance from the bottom of the side thereof, and that the second moving body sensor is mounted at a regular distance from the first moving body sensor in the inward direction of the specific object space without any sensing area overlapped with that of the first moving body sensor.

Of course, the electric device is mounted separately from the switch box, and as described above, electrically connected with the control means.

Moreover, the power saving switch according to the present invention can be applied to various fields for detecting approaching of the user and controlling certain operation of a system, such as a security system, a cooling and heating system, an air conditioning system, an operation control system of an electric appliance, and so on.

However, the power saving switch according to the present invention is not restricted to the automatic turning-on and turning-off of the electric device in the specific object space. In the present invention, the turning-on and turning-off in defining the scope of the present invention means the on/off functions of electric supply of lots of electric devices which have to be controlled according to a user' coming into and going out the specific object space, and the electric device means the above electric device. Of course, the control method for the automatic tuning-on and turning-off of the electric device means a method for controlling the electric device mounted inside the specific object space.

Furthermore, the electric device according to the present invention includes an electric illumination device, an electric fan, an automatic door opening and closing device, a sterilizer, a sound generator, an aromatic agent sprayer, a security system, a cooling and heating system, an air conditioning system, and an operation control system of an electric appliance, which are installed in the toilet or veranda.

BRIEF DESCRIPTION OF THE DRAWINGS

Further objects and advantages of the invention can be more fully understood from the following detailed description taken in conjunction with the accompanying drawings in which:

FIG. 1 is a block diagram of a power saving switch according to a preferred embodiment of the present invention;

FIG. 2 is a front view of a switch box provided with an input/output unit of FIG. 1;

FIG. 3 is a front view of the first modification of FIG. 2;

FIG. 4 is a front view of the second modification of FIG. 2;

FIG. 5 is a front view of a switch box provided with an input/output unit of FIG. 2 according to the latter preferred embodiment of the present invention;

FIG. 6 is a flow chart of operation of the power saving switch according to the present invention;

FIG. 7 is a system flow chart showing an example of a manual mode of the power saving switch according to the present invention;

FIG. 8 is a system flow chart showing a modification of FIG. 6;

FIG. 9 is a system flow chart showing an example of an semiautomatic mode of the power saving switch according to the present invention;

FIG. 10 is a block diagram of a power saving switch according to another preferred embodiment of the present invention;

FIG. 11 is a system block diagram showing another example of the power saving switch according to the present invention;

FIG. 12 is a system flow chart of FIG. 10;

FIG. 13 is a system block diagram showing a further example of the power saving switch according to the present invention;

FIG. 14 is a control flow chart of FIG. 13; and

FIG. 15 is a control flow chart of a modification of FIG. 13.

MODE FOR THE INVENTION

The present invention will now be described in detail in connection with preferred embodiments with reference to the accompanying drawings.

EMBODIMENT 1

FIG. 1 is a block diagram of a power saving switch 10 according to the present invention, and FIG. 2 is a front view of a switch box 102 provided with an input/output unit 100 of FIG. 1.

Referring to FIGS. 1 and 2, the power saving switch includes the input/output unit 100, an electric device 200 electrically connected with control means 110, which is included in the input/output unit 100, and a sensor 300 electrically connected with the control means 110.

In more detail, the input/output unit 100 includes an input part 120, a sound output part 130, an indicator 140, light emitting elements 150, and the control means 110 electrically connected with the input part 120, the sound output part 130, the indicator 140 and the light emitting elements 150 for generally controlling them.

Here, the input part 120 is an electronic touch button of a touch pad type or a mechanical switch button of a physical contact point type, and includes an automatic switch button 121 and a manual switch button 122. The automatic switch button 121 and the manual switch button 122 are manufactured into a typical one-touch button type. The sound output part 130 is a typical speaker. The indicator 140 includes a plurality of light emitting elements, such as lamps or LEDs (Light Emitting Diodes), which can convert an on-status and an off-status. One of the light emitting elements is a red-colored light, and the other is a green-colored light (see FIG. 2).

Referring to FIG. 2, the present invention will be described in more detail. The power saving switch includes: a frame 101 mounted on the outer wall surface of a door of a toilet, the frame 101 being provided with the switch box 102, which is partially buried and fixed therein; the control means 110 contained in the switch box 102; the input part 120, the sound output part 130 and the indicator 140 arranged on the front surface of the switch box 102 and electrically connected with the control means 110; and the light emitting elements 150 respectively mounted on the automatic switch button 121 and the manual switch button 122 of the input part 120.

At this time, the indicator 140 has used-status indicating portions 141 and 142 for indicating a used status, and the switch box 102 has character indicating portions 103 and 104 mounted at positions adjacent to the used-status indicating portions 141 and 142 and corresponding to the used-status indicating portions 141 and 142. As described above, the used-status indicating portion 141 indicates green-colored light, and the used-status indicating portion 142 indicates red-colored light.

Here, the control means 110 is not shown in FIG. 2, but is a circuit located inside the switch box 102 or a micom designed on the circuit. Hereinafter, referring to FIG. 6, the operation status of the power saving switch will be described based on the control means 110 in more detail.

FIG. 6 is a flow chart of operation of the power saving switch 10 according to the present invention.

Reviewing FIG. 6 in reference to FIGS. 1 and 2, when a user presses the automatic switch button 121 or the manual switch button 122 of the input part 120 manually (S101), the control means 110 supplies electric power to the electric device 200 in order to turn on the electric device 200, and at the same time, the electric device 200 is turned on and the operation of the sensor 300 is stopped in order to intercept electric power from being supplied to the sensor 300 (S102). Here, the sensor 300 can be one of an infrared sensor, which is a moving body sensor, an optical sensor, a proximity sensor for detecting approaching of the user, and an ultrasonic sensor.

Furthermore, the control means 110 provides electric power to the used-status indicating portion 142 of the indicator 140 in order to turn on the used-status indicating portion 142 of the red color, and thereby, the present invention indicates that the user exists within an object area (for instance, the toilet) (S103).

After that, the control means 110 provides electric power to the sensor 300 again after a predetermined time period (for instance, after 5 to 10 seconds for allowing the user to finish entering the object area) so that the sensor 300 is activated again (S104).

After that, when the user goes out of the object area, the sensor 300 detects it and transmits a detection signal to the control means 110 (S105).

The control means 110 turns off the used-status indicating portion 142 of the indicator 140 when receiving the detection signal from the sensor 300, and at the same time, supplies electric power to the used-status indicating portion 141 of the green color in order to turn on the used-status indicating portion 141 (S106). In the step (S101), when the user presses the automatic switch button 121, according to control of the control means 110, electric power supplied to the electric device 200 is automatically intercepted (S107). On the contrary, when the user presses the manual switch button 122, the step (S106) goes to a manual mode process (S110), which will be described later.

After the step (S107), according to control of the control means 110, the sound output part 130 outputs predetermined sound for a predetermined time period (S108), and then, stops the output of sound (S109). The above steps (S107) and (S108) can be omitted according to selection of a manufacturer.

Meanwhile, the manual mode process (S110) includes the steps of: (S111) outputting sound in order to inform the user of the turn-on status of the electric device 200; and (S112) manually turning off the electric device 200; and (S113) stopping output of sound by operation of the manual switch button by the user.

Here, in the sound output steps (S108 and S111), it is preferable that different sounds are outputted. Moreover, the sound output part 130 can output sounds of various types. That is, the sound output part 130 can output general beep sound, melodies, natural sound, such as water flowing sound, human voices, and so on. It is preferable that such sound information is stored in the control means 110.

Therefore, the present invention turns on the electric device 200 manually by operation of the automatic switch button 121 or the manual switch button 122 by the user, sets the sensor 300 to fail detection of entering of the user into the object area, and makes the sensor 300 detect going-out of the user from the inside to the outside of the object area. As a result, the present invention does not require a sensor of high sensitivity, and can be realized by the moving body sensor of a low price, which can detect only body.

EMBODIMENT 2

FIG. 3 is a front view of the first modification of FIG. 2, showing a modified indicator 140a.

Referring to FIG. 3, the indicator 140a includes transparent or semitransparent transmission panels on which predetermined characters are printed, and light emitting elements, such as the LEDs or small-sized lamps mounted inside the transmission panels, thereby improving visual recognizability of the user. Furthermore, since the predetermined characters are printed on the transmission panels, a used-status indicating portion 141a has the green-colored transmission panel, and a used-status indicating portion 141b has the red-colored transmission panel, the present invention can maximize recognition effect by means of color contrast. In addition, the present invention can increase visual recognizability of the user mainly at night since recognition efficiency of character indicating portions 103 and 104 can be improved.

EMBODIMENT 3

FIG. 4 is a front view of the second modification of FIG. 2. In FIG. 4, the structure of the indicator is omitted, an automatic switch button 121a and a manual switch button 122a of an input part 120a serve as the indicator.

Referring to FIG. 4, the automatic switch button 121a and the manual switch button 122a are made of transmissive material, and light emitting elements are located therein.

Furthermore, the automatic switch button 121a has characters meaning the "automatic switch button" thereon and characters, which are indicated on the transmission panel of the indicator of the above embodiment, and the manual switch button 122a has characters meaning the "manual switch button" thereon.

Therefore, when the user presses the automatic switch button 121a or the manual switch button 122a, the light emitting element contained in the automatic switch button 121a is turned on, and the characters printed on the automatic switch button 121a are displayed, so that the automatic switch button 121a or the manual switch button 122a serves as the indicator. After that, for an automatic off-status or a manual off-status of the electric device according to the above operation principle, the light emitting element contained in the manual switch button 122a is in an on-status and the light emitting element contained in the automatic switch button 121a is in an off-status. Therefore, the present invention can be simplified in structure, and improve its performance.

FIG. 7 is a system flow chart showing an example of the manual mode process (S110) of the power saving switch 10 according to the present invention, FIG. 8 is a system flow chart of a modification of FIG. 6, FIG. 9 is a system flow chart showing an example of the semiautomatic mode process of the power saving switch according to the present invention and showing the operation principle of FIG. 6 in more detail.

Referring to FIG. 7, when the user presses the manual switch button 122 or 122a, the system of the power saving switch 10 is started (S10).

After that, the power saving switch progresses the steps of turning on electric device, turning off the sensor, and turning on the indicator by the control means 110 (S10).

The control means 110 computes by itself whether or not the predetermined time period (t seconds) has passed (S30). The sensor is turned on if the answer to the step (S30) is "Yes" (S40), but the step is returned to the step (S20) if the answer to the step (S30) is "No".

Therefore, the control means 110 sets the sensor 300 to fail detection of entering of the user into the object area.

After the sensor 300 is activated by the step (S40), the sensor 300 detects that the user goes out of the object area (S50), and the sensor 300 transmits a detection signal to the control means 110, and thereby, the indication of the indicating portions of the indicator is converted by control of the control means 110 (S61). In the step (S50), if there is no detection object, the step is returned to the step (S40) in order to perform the continuous detection.

Here, at the same time with the above step (S61), according to control of the control means 110, the sound output part 130 outputs the predetermined sound (S62), and then, the power saving switch determines whether or not the user turns off the switch by the manual switch button 122 or 122a (S63). If the user turns off the switch, the power saving switch turns off the electric device and stops the sound output (S64), and thereby, all steps are ended (S70). However, if the user doesn't turn off the switch, the step (S63) is returned to the step (S62) to continuously output sound so as for the user to recognize it.

EMBODIMENT 4

FIG. 8 shows the modification of the step (S60), which includes the steps (S61 to S64).

Referring to FIG. 8, when the switch detects the user according to the detecting step (S50), the control means 110 performs the indication conversion step of the indicator (S61), and controls the sound output part 130 to output the predetermined sound (S62).

After that, the power saving switch determines whether or not the user turns off the switch after hearing the output sound. If the switch is turned off, the power saving switch turns off the electric device and stops the sound output (S64), and thereby, ends all of the steps (S70). However, if the switch is not turned off, the power saving switch determines whether or not the predetermined time period (t seconds) has passed (S65). If the answer is "yes", the power saving switch stops the sound output (S64) and ends all of the steps (S70), but if "No", the step is returned to the sound output step (S62) to continuously output sound.

Therefore, even though the electric device 200 is not turned off by means of the manual switch button 122 or 122a, the power saving switch makes the user recognize the on-status of the electric device by outputting the predetermined sound for the pre-determined time period (t seconds). If the user does not press the manual switch button 122 or 122a even after the predetermined time period (t seconds) (for instance, 5 to 20 seconds), the power saving switch regards that the user does not recognize it, and turns off the electric device and stops the sound output in order to end all steps. As a result, the power saving switch according to the present invention can use electric power efficiently.

Moreover, the flow of the system can be modified in various ways. That is, the sound output part can output sound not continuously but several times at regular intervals for the predetermined time period, and then, turns off the electric device and stops the sound output, and it also belongs to the scope of the present invention.

FIG. 9 is a system flow chart of the semiautomatic mode in a state where the user presses the automatic switch button 121 or 121a.

Referring to FIG. 9, the system is started when the user presses the automatic switch button 121 or 121a (S10), and then, the electric device is turned on, the sensor is turned off, and the indicator outputs indication (S20).

After that, the control means 110 computes whether or not the predetermined time period (t seconds) has passed (S30). If the answer to the step (S30) is "yes", the sensor is turned on (S40), but if "No", the step (S30) is returned to the step (S20).

After the sensor 300 is activated by the step (S40), the step (S40) goes to a sensing step (S50) by the sensor 300. In the step (S50), when the sensor 300 detects the user (namely, when the user goes out of the object area), the sensor transmits the corresponding signal to the control means 110, and then, the electric device is turned off and the indicator outputs indication conversion by control of the control means 110

(S61). In the above step (S50), if there is no detected object, the step (S50) is returned to the step (S40) to continuously detect approaching of the user.

Here, after the step (S61), the power saving switch ends the step (S70) after outputting the predetermined sound for the predetermined time period according to control of the control means 110 (S65).

Therefore, the present invention provides the user with convenience in use as there is no need for the user to perform additional switch manipulation.

EMBODIMENT 5

The sensor 300 of the power saving switch according to the present invention can be mounted on the entrance having a door, so as to achieve the above effect according to the opening and closing of the door (not shown).

In more detail, the sensor 300 may be a pair of magnetic sensors or proximity sensors, one of which is mounted at a predetermined position of the door, and the other of which is mounted at a portion of a doorframe corresponding to the above position.

Here, the magnetic sensor is divided into a magnetized contact point type operation principle and a magnetic detection type operation principle. In the magnetized contact point type operation principle, two metal plates are separated from each other at a pre-determined interval in normal time, but when a permanent magnet or an electromagnet approaches, one of the metal plates is magnetized by the permanent magnet, so that the metal plates form magnetic contact points respectively, and thereby, the metal plates are electrically connected with each other by power source applied to the metal plates.

In the magnetic detection type operation principle, a metal plate is electrically connected with control means and magnetized or released from magnetization according to approaching level of a permanent magnet. When the metal plate is magnetized, the control means detects the corresponding current, and when the current detected by the control means reaches a predetermined ampere (A), the control means opens or closes the corresponding circuit.

The magnetic sensors of the present invention with the magnetized contact point type operation principle includes a permanent magnet mounted on the door, a metal plate mounted on the doorframe corresponding to the permanent magnet, and a solenoid electromagnet electrically connected with the control means 110 at a portion adjacent to the metal plate magnetized by the permanent magnet.

The operation principle will be described in more detail. Under a state where the door is closed, since the metal plate magnetized by the permanent magnet and the metal plate adjacent to the magnetized metal plate form a magnetic contact point with each other, there is no function and effect.

After that, when the user presses the input part 120, as described above, the control means 110 supplies electric power to the electric device 200, and at the same time, supplies the solenoid electromagnet with electric current for a predetermined time period so as to induce generation of magnetic force. Therefore, even though the user opens the door, since the two metal plates keep the magnetic contact point, there is no function and effect.

After that, when the user closes the door, since the magnetized metal plate exists as the magnetized metal plate by the permanent magnet mounted on the door without regard to the solenoid electromagnet, the magnetic contact point can be kept continuously.

After power supply to the solenoid electromagnet is stopped, when the user opens the door again, the permanent magnet is separated from the magnetized metal plate, and the magnetized metal plate and the other metal plate are released from the mutual magnetic contact points, and thereby, electric power supplied to the electric device 200 is stopped. So, the magnetic sensors of the magnetized contact point type have the same system flow as the first to fourth embodiments.

Meanwhile, the magnetic sensors of the present invention with the magnetic detection type operation principle, as described above, include a permanent magnet mounted on the door, a metal plate mounted on the doorframe corresponding to the permanent magnet and electrically connected with the control means 110, and a solenoid electromagnet arranged adjacently to the metal plate and electrically connected with the control means 110.

The operation principle will be described in more detail. Under a state where the door is closed, magnetic force generated from the metal plate by the permanent magnet is detected to the control means 110 in an electric current form.

Under the state where the door is closed, the metal plate is magnetized by the permanent magnet, and the control means 110 detects a predetermined electric current, but there is no function and effect.

After that, when the user presses the input part 120, as described above, the control means 110 supplies electric power to the electric device 200, and at the same time, supplies electric current to the solenoid electromagnet only for a predetermined time period in order to induce generation of magnetic force.

After that, when the user closes the door, the control means 110 continuously detects electric current by the permanent magnet mounted on the door, but there is no function and effect.

Therefore, even though the user closes or opens the door, the control means 110 cannot detect whether or not the door is opened or closed as continuously detecting electric current.

After power supply to the solenoid electromagnet is stopped, when the user opens the door again, the permanent magnet is separated from the metal plate, and the control means 110 does not detect electric current according to the above function and effect, so that the control means 110 automatically stops electric power supplied to the electric device 200. So, the magnetic sensors of the magnetic detection type have the same system flow as the first to fourth embodiments.

The magnetic sensor applied to the present invention can be changed in various types. That is, the magnetic sensor can realize the magnetized contact point type, the magnetic detection type, or a type where the magnetized contact point type and the magnetic detection type are combined. Namely, the magnetic sensor using the magnetized contact point is designed in such a way as to put out the electric device automatically and/or manually, and the magnetic sensor using the magnetic detection is designed in such a way as to output sound and to output indication or indication change of the indicator 140.

Therefore, the present invention can provide the sensors of lower manufacturing cost, so as to greatly reduce the manufacturing cost and to design the sensor in various ways according to the manufacturer's intention.

EMBODIMENT 6

FIG. 10 is a block diagram of a power saving switch 10a according to another preferred embodiment of the present invention, and FIG. 5 is a front view of a switch box 102*a* including an input/output unit 100*c* of FIG. 2.

Referring to FIGS. 5 and 10, the power saving switch 10*a* has the structure of the third embodiment, and further includes a dial 161 located under the switch box 102*a*. The dial 161 allows the user to manually set a time setting part 160, such as a timer. At this time, the time setting part 160 is electrically connected with the control means 110, and a level indication part 162 is printed on the front surface of the switch box 102*a* corresponding to the dial 161, so that the user can set time by rotating the dial 161.

The time setting part 160 can be set according to the user's intention and increase convenience in use as serving to set operation stopping time of the sensor 300, which is described above.

FIG. 5 shows the dial 161, but a setting button of a digital input type and a display part for displaying the corresponding level can be realized. Moreover, in a state where a reference setting time (for instance, 5 to 10 seconds) is inputted, a reset button can be added, so that the setting time is reset to the reference setting time when the user presses the reset button.

EMBODIMENT 7

FIG. 11 is a system block diagram of a power saving switch 10*b* according to a further embodiment of the present invention, and FIG. 12 is a system flow chart of FIG. 11. The power saving switch shown in FIGS. 11 and 12 can automatically turn on and off the electric device by the sensor 300, thereby providing the user with convenience.

Referring to FIGS. 11 and 12, the power saving switch 10*b* includes control means 110 and a sensor 300 electrically connected with the control means 110. The control means 110 is electrically connected with the electric device 200, and supplied with the external power source.

Referring to FIG. 12, the operation principle of the power saving switch will be described in more detail. When the sensor 300 detects the moving body or the opening of the door, the sensor 300 transmits a detection signal to the control means 110 (S1).

In the above step (S1), the control means 110 controls the electric device 200 to be automatically turned on (S2), and at the same time, stops operation of the sensor 300 for a predetermined time period (S3). After that, the control means 110 converts the sensor 300 into a turn-off sensor after a lapse of the predetermined time period in the automatic turn-on step (S4).

After the predetermined time period, when the sensor 300 detects the moving body or the opening of the door, the sensor transmits a corresponding signal to the control means 110 (S5), and then, the control means 110 controls the electric device 200 to be automatically turned off (S6) and at the same time stops operation of the sensor 300 for a predetermined time period (S7). At this time, the sensor 300 is converted into a turn-on sensor (S8), and then, the step (S8) is returned to the above step (S1) in order to continuously detect the moving body or the opening of the door and perform the automatic turning-on and turning-off.

In the above steps (S3) and (S7), the control means stops operation of the sensor during delay time (for instance, 5~10 seconds) occurring due to the user who wears slippers or opens and closes a door when the user enters or leaves an object area, such as a toilet. As a result, the control means does not receive a detection signal of moving body or opening and closing of the door from the sensor during the delay time, thereby preventing the repeated automatic turning-on and turning-off of the electric device.

According to the present invention, the above steps (S3) and (S7) can be omitted when the power saving switch is applied in the opened hallway.

Therefore, when the sensor 300 first detects the moving body or the opening of the door, the control means 110 automatically turns on the electric device, at the same time stops operation of the sensor 300 for the predetermined time period, in order to prevent the sensor from detecting approaching of the user when the user enters the object area, and then the sensor 300 is converted into the turn-off sensor after the pre-determined time period from the first detecting step.

After that, when the sensor 300 second detects the moving body or the opening of the door, the control means 110 automatically turns off the electric device, and at the same time, the sensor 300 is converted into the turn-on sensor, and thereby, the electric device 200 can be automatically turned on and off.

Of course, the power saving switch according to this embodiment may include at least one selected from the input part, the indicator, the sound output part and the time setting part, which are described in the first to sixth embodiments. The operation principle of this embodiment will not be described since this embodiment has the same operation principle as the above embodiments.

In addition, if the power saving switch of this embodiment includes the input part 120 or 120*a*, the power saving switch may be converted into an automatic mode or the semiautomatic mode when the user presses the automatic switch button 121 or 121*a* or the manual switch button 122 or 122*a* for a predetermined time period.

As described above, according to the first to fourth embodiments and the sixth embodiment, the power saving switch can be installed to various positions, such as the opened-type entrance without the door (for instance, the entrance located between the living room and the kitchen), the closed-type entrance with the door, the hallway, the front door, and so on. The fifth embodiment can be applied to the closed-type entrance with the door (for instance, the toilet, the study room, the inner room, and so on).

Furthermore, the power saving switch according to the present invention can be modified in various ways. That is, the specific parts of the first to sixth embodiments can be adopted selectively, and it can belong to the scope of the present invention.

EMBODIMENT 8

FIG. 13 is a system block diagram showing a further example of the power saving switch according to the present invention, and FIG. 14 is a control flow chart of FIG. 13. In this embodiment, the power saving switch can be automatically turned on and off by the sensor 300, thereby providing a number of users with convenience in use.

In FIG. 14, the power saving switch according to the present invention includes a sensor 400 having a first moving body sensor 410 and a second moving body sensor 420, a manual switch 500, and control means 110 electrically connected to the sensor 400 and the manual switch 500. The control means 110 is also electrically connected to the electric device 200 installed inside a specific object space.

Here, it is preferable that the first and second moving body sensors 410 and 420 of the sensor 400 are infrared sensors, but it would be appreciated that the first and second moving body sensors 410 and 420 may be one selected from an ultrasonic sensor, a proximity sensor, and an optical sensor having a light transmitting part and a light receiving part, which can detect a human body's going in and out. Particularly, the optical sensor having the light transmitting part and the light receiving part can control the detection distance and sensitivity by controlling a resistance value, and can minimize an error in detection of the user existing in the toilet since it can correctly perform operation in such a manner as to increment or decrement by 1 according to a result detected in order of light transmission, reflection and light reception. In addition, the optical sensor has another advantage in that it minimizes malfunction or error due to interference or overlapped detection between the sensors owing to directivity of light.

The first moving body sensor 410 is mounted on an entrance of the specific object space or inside the specific object space adjacent to the entrance of the specific object area, and the second moving body sensor 420 is mounted on one of an adjacent portion of the specific object space, the internal ceiling surface, a wall surface and others at a predetermined distance from the first moving body sensor in the inward direction of the specific object space. At this time, the second moving body sensor 420 is mounted at a position which is not overlapped with an effective detection range of the first moving body sensor 410, namely, a position adjacent to the electric device 200. The optical sensor having the light transmitting part and the light receiving part provides weak interference between the sensors, and so, the first and second moving body sensors 410 and 420 can be mounted adjacently. In this case, the sensors may be located in a row on the side surface of the entrance.

However, the power saving switch according to the present invention may adopt another sensor besides the optical sensor having the light transmitting part and the light receiving part. In this case, to prevent an error due to interference between the sensors generated since the detection width of the sensor is wide, the first moving body sensor 410 is mounted in such a way that a detection angle of the first moving body sensor 410 is set to an angle of about 5° from the doorframe in such a way as to detect only the moving body going in and out of the entrance of the specific object space, and the second moving body sensor 420 is mounted inside the specific object space within a range that a detection angle of the second moving body sensor 420 is not overlapped with that of the first moving body sensor 410. The detection angle can be controlled by the manufacturer in consideration of the area and structure of the specific object space, but is mostly set to about 90° so that the most interior area of the specific object space becomes the effective detection distance. At this time, it is preferable that the detection angle of the second moving body sensor 420 is set without overlapping with the detection angle of the first moving body sensor 410 so as to minimize an error rate in detection of the moving body and maximize its detection efficiency.

However, a detailed description of the position of the sensors will be omitted since those skilled in the art may mount the sensors at proper positions according to features of the specific object space and features of the moving body sensors.

Meanwhile, the control means 110 includes a circuit board formed integrally with the inside of a switch box (not shown) containing the manual switch 500, the first moving body sensor 410 or the second moving body sensor 420, and a micom circuit-designed on the circuit board. Referring to FIGS. 14 and 15, operation of the power saving switch according to the present invention will be described in more detail, centering to the control means 110.

In FIG. 14 referring to FIG. 13, the first moving body sensor mounted on the entrance of the specific object space or inside the specific object space adjacent to the entrance and the second moving body sensor mounted in the inward direction of the first moving body sensor detect the moving body in order when the user enters the specific object space (S210, S220). At this time, when the control means 110 receives detection signals from the first and second moving body sensors 410 and 420 in order by the steps of S210 and S220, the control means 110 automatically turns on the electric device 200 installed inside the specific object space (S230). That is, when the sensors detect that the user enters the specific object space, the electric device 200 is automatically turned on.

After that, when the user goes out of the specific object space, the second moving body sensor 420 mounted inside the specific object space detects it (S240), and then, the first moving body sensor 410 detects the moving body. When the control means 110 receives the detection signals from the moving body sensors 410 and 420 in order, the control means 110 recognizes that the user goes out of the specific object space and automatically turns off the electric device 200 (S250), and then, is returned to the initial step (S210) in order to continuously progress the automatic turing-on and turning-off.

Meanwhile, after the automatic turning-on or turning-off by the power saving switch, if the predetermined period operation of the sensors is not stopped, since the moving body sensors are operated continuously, the electric device may be malfunctions, for example undesired turning-on or turning-off of the electric device, due to the user's movement at an area adjacent to the moving body sensors. Therefore, the control means 110 of the power saving switch according to the present invention automatically turns on the electric device installed inside the specific object space (S230) when it receives the detection signal from the second moving body sensor 420 after receiving the detection signal from the first moving body sensor 410. After that, the control means 110 turns off the first and second moving body sensors for a pre-determined time period (S231). After that, it is preferable that the control means 110 automatically turns off the electric device installed inside the specific object space (S260) when it receives the detection signal from the first moving body sensor 410 after receiving the detection signal from the second moving body sensor 420, and then, stops operation of the first and second moving body sensors 410 and 420 for a pre-determined time period (S261).

In fact, the first and second moving body sensors 410 and 420 continuously detect the moving body, and so, the control means 110 automatically turns off the electric device 200 only when the steps of the first moving body sensor's moving body detection/the second moving body sensor's moving body detection->operation and the steps of the second moving body sensor's moving body detection/the first moving body sensor's moving body detection->stop are carried out in order. As a result, the control means 110 can perform the automatic turning-on and turning-off more safely by recognizing the user's movement as a location displacement pattern of going into/existing in/going out of the specific object space.

EMBODIMENT 9

The power saving switch according to the present invention described the above is effective in a small specific object space, namely, in a case where only one user exists in the specific object space, but has a problem in that the electric device is stopped when a user of lots of users existing in the specific object space, such as a public toilet for the purpose of use of many people, goes out. Therefore, the power saving switch needs a technical structure for stopping the electric device only when there is no person inside the specific object space. Referring to FIG. 15, the power saving switch including such technical structure will be described.

That is, the power saving switch according to the present invention automatically stops the electric device 200 if there is no user inside the specific object space after detecting the number of the users existing inside the specific object space by the number of detection of the moving body sensor. To detect the number of the users existing inside the specific object space, the control means 110 of the power saving switch according to the present invention actuates when the user approaches the specific object space (S301), namely when detection signals are detected in order of the first moving body sensor and the second moving body sensor (S302), and at this time, performs operation in such a manner as to increment by 1. Moreover, the control means 110 performs operation in such a manner as decrement by 1 whenever the user goes out the specific object space, namely whenever detection signals are detected in order of the second moving body sensor and the first moving body sensor (S304, S305).

The control means 110 continuously turns on the electric device 200 (S306) when the operation result is more than 1 (when at least one user exist inside the specific object space), but stops the electric device 200 (S307) only when the operation result is 0 (when there is no user inside the specific object space). It is preferable that the control means recognizes the operation result which is less than 0 as 0 since the operation result is less than 0 means a detection error.

The method of controlling the automatic turning-on and turning-off according to the detection number of the sensor has an advantage in that the electric device is stopped only when there is no user inside the specific object space even though a number of the users go in and out the specific object space such as the public toilet in random order.

Furthermore, as described above, the control means 110 may be electrically connected with the manual switch 500 mounted on the outer surface of the entrance of the specific object space, so that the control means 110 allows the manual turning-on and turning-off of the electric device 200 according to the user's intention.

The power saving switch according to the present invention may be modified in various ways. That is, it is to be noted that the inventive power saving switch may be implemented in such a manner that the indicator is contained in the switch box of the manual switch 500 in order to inform the outside user that another user exists inside the specific object space, which also belongs to the technical scope of the present invention.

INDUSTRIAL APPLICABILITY

As described above, compared with the conventional human body detecting illumination system, the power saving switch of the present invention requires lower manufacturing cost as having the structure for simply sensing the moving body.

Moreover, the present invention can turn on the electric device by the manual lighting, and at the same time, stop operation of the sensor for the predetermined time period so as for the sensor to fail detection of approaching of the user. When the user goes out of the object area, the sensor detects the moving body or the opening or closing of the door so as to automatically turn off the electric device or to output the predetermined sound to allow the user to recognize the on-status of the electric device. So, the present invention can provide the same effect as a plurality of high-sensitive sensors using the minimum components.

Therefore, the present invention reduces the manufacturing cost, increases convenience in use, improves energy efficiency, and greatly increases durability of the electric device.

Furthermore, the present invention shows information of on or off status of the electric device by lighting up or displaying the predetermined characters or figures or by turning on or off the indication lamps or the character indication parts of the pre-determined colors, thereby managing energy efficiently and increasing convenience in use.

Meanwhile, the sensor can adopt various types, such as the moving body sensor, the door-opening sensor for detecting the opening and closing status of the door, and so on, and thereby, the present invention expands the selection range of the manufacturer.

Moreover, the present invention can be applied more variously, for example, the user operates selectively the automatic mode, the semiautomatic mode and the manual mode. And since the present invention omits an illuminance sensor, it can reduce an error ratio due to the illuminance sensor, reduce the manufacturing cost, and realize a simple manufacturing process through the simple structure and the simple control method.

Furthermore, in the case where a number of the users use the specific object space, the power saving switch according to the present invention keeps the on-status of the electric device as it is even though a number of the users go into the specific object space so that unnecessary tuning-on and turning-off is not generated repeatedly, and automatically turns off the electric device after the control of turning-on and turning-off according to the user's going in and out, namely after detection of going in/existence/going out of the user, thereby providing the method for controlling the automatic turning-on and turning-off of the electric device according to the user's location displacement pattern. So, the present invention can provide a new power saving switch different from prior arts.

In addition, the present invention can widen the width of selection for manufacturers and consumers since the moving body sensors of various types can be applied, minimize the error rate since it provides very excellent sensing efficiency, and improves convenience in use since the manual switch is mounted on the entrance of the specific object space in order to allow the user to turn on and off the electric device according to the user's intention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A power saving switch comprising:
a first moving body sensor arranged on an entrance of a specific object space or on a position adjacent to the entrance;
a second moving body sensor arranged in the inward direction of the specific object space from the first moving body sensor; and
control means electrically connected with the first and second moving body sensors, wherein the control means automatically turns on an electric device installed inside the specific object space when a detection signal of the second moving body sensor is received after a detection signal of the first moving body sensor is received, and wherein the control means automatically turns off the electric device when the detection signal of the first moving body sensor is received after the detection signal of the second moving body sensor is received, and wherein the control means stops operation of the first and second moving body sensors for a predetermined time period after automatically turning on the electric device installed inside the specific object space when the detection signal of the second moving body sensor is received after the detection signal of the first moving body sensor is received, and wherein the control means stops operation of the first and second moving body sensors for a predetermined time period after automatically turning off the electric device installed inside the specific object space when the detection signal of the first moving body sensor is received after the detection signal of the second moving body sensor is received.

2. A power saving switch according to claim 1, wherein the first and second moving body sensors are optical sensors, each having a light transmitting part and a light receiving part.

3. A power saving switch comprising:
a first moving body sensor arranged on an entrance of a specific object space or on a position adjacent to the entrance;
a second moving body sensor arranged in the inward direction of the specific object space from the first moving body sensor; and
control means electrically connected with the first and second moving body sensors, wherein the control means automatically turns on an electric device installed inside the specific object space when a detection signal of the first moving body sensor is received, and wherein the control means automatically turns off the electric device when the detection signal of the first moving body sensor is received after the detection signal of the second moving body sensor is received, and wherein the control means stops operation of the first and second moving body sensors for a predetermined time period when the detection signal of the second moving body sensor is received after the detection signal of the first moving body sensor is received or when the detection signal of the first moving body sensor is received after the detection signal of the second moving body sensor is received.

4. A method for controlling a power saving switch comprising the steps of:
i) automatically turning on an electric device installed inside a specific object space when a detection signal of a second moving body sensor arranged in the inward direction of the specific object space from a first moving body sensor is received after a detection signal of the first moving body sensor arranged on an entrance of the specific object space or on a position adjacent to the entrance is received;
ii) automatically turning off the electric device installed inside the specific object space when the detection signal of the first moving body sensor is received after the detection signal of the second moving body sensor is received; and
iii) stopping operation of the first and second moving body sensors for a predetermined time period after the i) step of automatically turning on the electric device and after the ii) step of automatically turning off the electric device.

* * * * *